United States Patent [19]

Knud

[11] 4,114,682
[45] Sep. 19, 1978

[54] APPARATUS FOR HEATING, COOLING OR AIR-CONDITIONING A ROOM

[75] Inventor: Vagn Valbjorn Knud, Nordborg, Denmark

[73] Assignee: Danfoss A/S, Nordborg, Denmark

[21] Appl. No.: 781,576

[22] Filed: Mar. 28, 1977

[30] Foreign Application Priority Data

Apr. 3, 1976 [DE] Fed. Rep. of Germany ....... 2614432

[51] Int. Cl.² .............................................. B60H 1/00
[52] U.S. Cl. ........................................ 165/39; 236/42; 236/99 E
[58] Field of Search ....................... 165/39, 40, 26, 27, 165/50; 236/1 E, 42, 99 E

[56] References Cited

U.S. PATENT DOCUMENTS 3,241,602  3/1966  Andreassen .............................. 165/26
3,425,485  2/1969  Newton ................................... 165/27

Primary Examiner—Charles J. Myhre
Assistant Examiner—Margaret A. LaTulip
Attorney, Agent, or Firm—Wayne B. Easton

[57] ABSTRACT

The invention relates to apparatus for heating and/or cooling a room which is large enough to require at least two heat exchanger units. Controls are provided which dependingly relate the outgoing air stream temperatures of the heat exchangers to avoid the causing of drafts in the room. One of the heat exchangers is a guide unit and all others are follower units. Each heat exchanger has its own individual control such as a valve for admitting heat exchange fluid to the unit. The guide unit has associated room temperature sensor and setting devices for controlling its individual control. Each follower unit has a pair of temperature sensors for jointly controlling its associated individual control. One sensor of each pair is in the outflowing air stream of the guide unit and the other sensor of the pair is in the outflowing air stream of the associated follower unit.

4 Claims, 3 Drawing Figures

APPARATUS FOR HEATING, COOLING OR AIR-CONDITIONING A ROOM

The invention relates to an apparatus for heating, cooling or air-conditioning a room, comprising at least two heat exchangers each regulated by a thermostatically controlled valve.

Thermostatic valves operating with a solid expansible substance, an expansible liquid or vapour pressure are as a rule independent of external energy and can therefore be very simply constructed. Such thermostatic valves are therefore widely used for regulating a quantity of hot water flowing through a heater in heating installations but also for convectors of air-conditioning installations etc. However, a disadvantage of this simple and cheap solution resides, for example in comparison with pneumatically or electrically actuated systems, in that each thermostat can regulate only one valve.

This leads to difficulties in the case of rooms having several heat exchangers. If each heat exchanger is provided with its own valve, it is possible for the air circulation will cause the room temperature sensor associated with one heat exchanger to detect temperature fluctuations tha emanate from one of the other heat exchangers. If the individual thermostatic valves do not regulate to the same desired value, for example because different desired values are set, large and unintentional longitudinal currents are set up in the room which are felt as a draught. This is particularly so when the impulse of the air that is blown in is small compared with the gravitational forces of the air currents which have different temperatures or if there is no blowing in at all. If, however, only one thermostatic valve is provided for the room to regulate the throughflow through a plurality of heat exchangers, the flexibility of the room arrangement is impaired. A change in the room arrangement by altering the position of partitioning walls is permissible only if the primary side of the heat exchangers is altered and the heat exchanger groups of the new rooms are re-allocated to the appropriate thermostatic valve.

The invention is based on the problem of providing an apparatus of the aforementioned kind in which uniform regulation of all heat exchangers in a room is possible and changes in the room arrangement can be taken into account in a single manner.

This problem is solved according to the invention in that only the thermostatic valve of the one heat exchanger — the guide unit — comprises an adjustable desired value generator and a sensor subjected to the room temperatue, whereas the thermostatic valve of each further heat exchanger — the follower unit — comprises two sensors connectd by capillary tubes, of which the first is disposed in the outflowing air stream of the guide unit and the second is disposed in the outflowing air stream of the follower unit and is so controlled that the air outlet temperature of the follower unit is approximately the same as the air outlet temperature of the guide unit.

In this apparatus, the guide unit is regulated in conventional manner. The sensor can be arranged in a position of the room that is characteristic for the room temperature. On the other hand, the follower unit is sited so that it allows air to exit at approximately the same temperature as the guide unit. For this reason the heat output of the follower unit will follow the heat output of the guide unit, whereby a similar temperature profile is achieved along the room.

If the room arrangement is changed by transposing intermediate walls, different groupings of the heat exchangers result in the new rooms. In such a case it is merely necessary in the case of a follower unit that is now located in a room with a different guide unit to transfer the first sensor with its capillary tube so that it is no longer arranged at the outlet side of the previous guide unit but at the outlet side of the new guide unit. Should there be two guide units in a room after it has been newly sub-divided, all that is necessary is to take the thermostat attachment with the room temperature sensor off one guide unit and replace it with a thermostat attachment having two capillary tube sensors which should be appropriately sited to convert the guide unit to a follower unit. The converse takes place if, after the new sub-division, only follower units are located in a room.

It is of particular advantage if the two sensors of the thermostatic valve of the follower unit comprise a vapour or liquid-vapour filling and its closure member is controlled by an operating element that is subjected to the pressure difference. This results in very simple valve construction. The valve is closed when the pressure is in equilibrium. With an increase in pressure difference of the one sign, the valve wll be opened increasingly. With a pressure difference of the opposite sign, the valve remains closed. Adjustments can for example be undertaken by adjusting a desired value spring that acts against the pressure difference.

Such an apparatus is suitable not only for heating but also for cooling. In this case it is merely necessary for the thermostatic valve of the follower unit to be reversed. In the simplest case, this takes place by interposing the first and second sensors. However, one can also use an actuator attachment which brings about a reverse control. Further, it is possible for the valve itself to have a reverse functon.

The apparatus is also suitable for installations in which the guide unit can be switched from heating to cooling operation. In this case it is advisable for the follower unit to be connected to a heating medium circuit and a cooling medium circuit by a respective thermostatic valve, both valves comprising a first and a second sensor but functoning in reverse. For heating operation, the first valve will then be effective whilst the second valve is in its closed position. For cooling operation, the second valve is effective whilst the first is in the closed position.

Nor is the apparatus restricted to a special type of valve or to a special circuit for the primary sides of the heat exchangers. For example, the heat exchangers may be connected in series and the thermostatically controlled valves may be in the form of three-way bypass valves.

The invention will now be described in more detail with reference to the examples diagrammatically illustrated in the drawing, in which.

Figure 1:
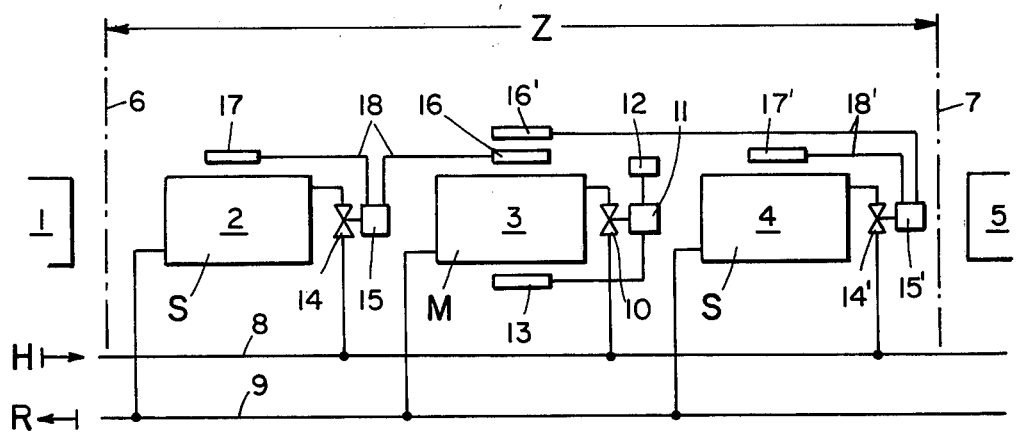
FIG. 1 is an apparatus for the heating of a room.

In FIG. 1, identical heat exchangers 1 to 5 are shown arranged along the outer wall of a room, e.g. each below a window. The heat exchangers 2 to 4 are allocated to a zone Z extending between two boundaries 6 and 7, e.g. partitioning walls. All the heat exchangers are connected to a common supply line 8 for hot water H and a common return line 9 for the return water R. The heat exchangers may be normal radiators, convectors or the like.

The heat exchanger 3 is in the form of a guide unit M. On the inlet side it comprises a thermostaic valve 10 with a thermostat attachment 11 which is provided with a desired value setting device 12 and a room temperature sensor 13. Such heat exchangers are known in the form of individual heat exchangers.

The two heat exchangers 2 and 4 serve as a following unit S. In the inlet line, they each comprise a thermostatic valve 14, 14′ with a thermostat attachment 15, 15′ with which a first sensor 16, 16′ is connected in the outlet air current of the guide portion M and a second sensor 17, 17′ is connected in the outlet air stream of the associated follower unit S, in each case by way of capillary tubes 18, 18′. The thermostatic valves 14, 14′ are designed so that the temperature of the air leaving the follower units S is approximately the same as the temperature of the air leaving the guide unit M.

Although three heat exchangers, each with its own valve, are provided in the zone Z, air of approximately the same temperature is delivered by the heat exchangers throughout the entire zone. If the zone Z should be changed, for example by transposing the partitioning 7 to the left-hand side between the heat exchangers 3 and 4, the control conditions for the heat exchangers 2 and 3 remain unchanged. The heat exchanger 4 can operate as a follower unit S in the new room if, for example, the heat exchanger 5 represents the guide unit M in that the first sensor 16′ is simply placed in the air stream leaving the heat exchanger 5. This is very simply done by repositioning the capillary tube 18′.

Figure 2:
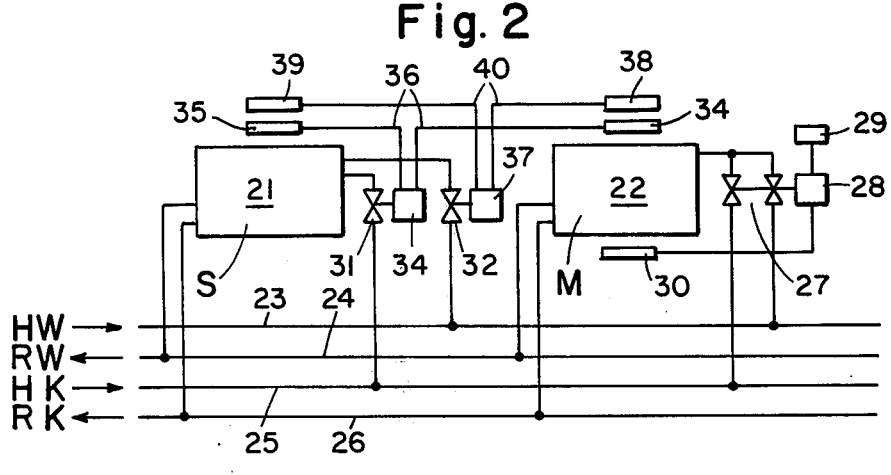
FIG. 2 is an apparatus for air-conditioning a room.

In the FIG. 2 embodiment there are heat exchangers 21 and 22 that are to be associated with a predetermined zone. The heat exchanger 22 serves at the guide unit M and the heat exchanger 21 serves as the follower unit S. Since heating is to be possible as well as cooling, there are provided a supply line 23 for hot water HW, a return line 24 for warm water RW, a supply line 25 for cold water HK and a return line 26 for cold water RK.

The guide unit M comprises a thermostatic three-way valve 27 with a thermostat attachment 28 having a desired value setting device 29 and a room temperature sensor 30. In the usual way, this valve 27 leads hot water through the heat exchanger 22 when the room temperature is too low and cold water when the room temperature is too high.

The follower unit S is equipped with a thermostatic valve 31 for cold water supply and a thermostatic valve 32 for hot water supply. The valve 31 comprises a thermostat attachment 33 which is connected by capillary tubes 36 to a first sensor 34 on the outlet side of the guide unit M and a second sensor 35 on the outlet side of the follower unit S. The valve 32 possesses a thermostat attachment 37 which is connected by capillary tubes 40 to a first sensor 38 on the outlet side of the guide unit M and a second sensor 39 on the outlet side of the follower unit S. The two valves 31 and 32 operate in opposite directions. With positive temperature differences between the first and second sensor the valve 32 opens whilst the valve 31 remains closed. With negative temperature differences the valve 31 opens whilst the valve 32 remains closed. In this way one obtains automatic switching over from heating to cooling operation governed by the manner of operation of the guide unit M. When the latter is on heating operation, the outlet temperature of the air will be higher than the room temperature and thus initially higher than the outlet temperature of the follower unit S. On cooling operation, however, the outlet temperature of the guide unit M is lower than the room temperature and therefore initially also lower than the outlet temperature of the follower unit S.

Figure 3:
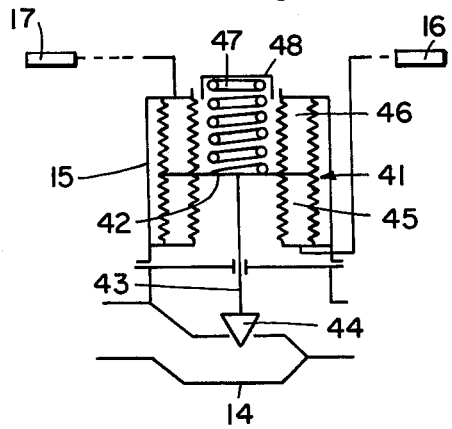
FIG. 3 is a thermostatic valve for a follower unit.

The sensors preferably have a liquid-vapour filling so that the vapour pressure in the sensor is a measure of the temperature. In this case, the desired value setting device for the thermostatic valve 10 can be a spring of which the force is adjustable. The selected thermostatic valve 14 may be one corresponding to FIG. 3. The operating element 41 accommodated in the attachment 15 and acting on the closure member 44 by way of a plate 42 and a push member 43 separates two annular chambers 45 and 46 from one another, these chambers being bounded by two concentric corrugated tubes. The annular chamber 45 communicates with the first sensor 16 and the annular chamber 46 communicates with the second sensor 17. In addition, the plate 42 is loaded by a weak spring 47 which is adjustable by a screw cap 48. As long as the temperature of the sensor 16 is higher that that of the sensor 17, i.e. there is a positive pressure difference, the plate 42 is displaced upwardly against the force of the spring 47 so that the valve 14 opens. As soon as the temperature of the sensor 17 corresponds to that of the sensor 16, the valve will close again.

I claim:

1. Apparatus for controlling the temperature of a room comprising at least two heat exchangers with one being a guide unit and all others being follower units, individual control means for each of said heat exchangers, room temperature sensor and setting means for controlling said individual control means of said guide unit, a pair of temperature sensors for jointly controlling said individual control means of each said follower unit to dependingly relate the temperature of the outgoing airstream of the associated follower unit to the temperature of the outgoing airstream of said guide unit, one sensor of said pair being in the outflowing air stream of said guide unit and the other sensor of said pair being in the outflowing air stream of the associated follower unit.

2. Apparatus according to claim 1 wherein said individual control means comprise valve means for controlling the flow of heat exchange fluid to said heat exchangers.

3. Apparatus according to claim 1 wherein said heat exchangers comprise heating apparatus.

4. Apparatus according to claim 1 wherein said heat exchangers comprise cooling apparatus.

* * * * *